United States Patent
Guo et al.

(10) Patent No.: US 8,527,432 B1
(45) Date of Patent: Sep. 3, 2013

(54) SEMI-SUPERVISED LEARNING BASED ON SEMIPARAMETRIC REGULARIZATION

(75) Inventors: Zhen Guo, Elkins Park, PA (US); Zhongfei (Mark) Zhang, Vernon, CT (US)

(73) Assignee: The Research Foundation of State University of New York, Binghamton, NY (US)

( * ) Notice: Subject to any disclaimer, the term of this patent is extended or adjusted under 35 U.S.C. 154(b) by 500 days.

(21) Appl. No.: 12/538,849

(22) Filed: Aug. 10, 2009

Related U.S. Application Data

(60) Provisional application No. 61/087,170, filed on Aug. 8, 2008.

(51) Int. Cl.
*G06F 15/18* (2006.01)
*G06E 1/00* (2006.01)
*G06E 3/00* (2006.01)
*G06G 7/00* (2006.01)

(52) U.S. Cl.
USPC .................................. 706/12; 706/14; 706/20

(58) Field of Classification Search
None
See application file for complete search history.

(56) References Cited

U.S. PATENT DOCUMENTS 7,299,213 B2 * 11/2007 Cristianini ...................... 706/12
8,046,317 B2 * 10/2011 Dasgupta et al. ............... 706/45

OTHER PUBLICATIONS

Shlens, Jonathon. "A Tutorial on Principal Component Analysis." Systems Neurobiology Laboratory, Salk Institute for Biological Studies (2005).*
Belkin, Mikhail; Niyogi, Partha; Sindhwani, Vikas. "Manifold Regularization: A Geometric Framework for Learning from Labeled and Unlabeled Examples." J. Mach. Learn. Res. 7 (2006): 2399-2434.*
Zhu, Ziaojin. "Semi-Supervised Learning Literature Survey." (2007).*
Z. Guo, Z. Zhang, E. Xing, and C. Faloutsos, "Semi-supervised learning based on semiparametric regularization," in Proc. SIAM Int. Conf. Data Min., 2008, pp. 132-142.*
Deli Zhao; Zhouchen Lin; Xiaoou Tang; , "Laplacian PCA and Its Applications," Computer Vision, 2007. ICCV 2007. IEEE 11th International Conference on , vol., No., pp. 1-8, Oct. 14-21, 2007.*

* cited by examiner

*Primary Examiner* — Kakali Chaki
*Assistant Examiner* — Daniel Pellett
(74) *Attorney, Agent, or Firm* — Steven M. Hoffberg; Ostrolenk Faber LLP

(57) ABSTRACT

Semi-supervised learning plays an important role in machine learning and data mining. The semi-supervised learning problem is approached by developing semiparametric regularization, which attempts to discover the marginal distribution of the data to learn the parametric function through exploiting the geometric distribution of the data. This learned parametric function can then be incorporated into the supervised learning on the available labeled data as the prior knowledge. A semi-supervised learning approach is provided which incorporates the unlabeled data into the supervised learning by a parametric function learned from the whole data including the labeled and unlabeled data. The parametric function reflects the geometric structure of the marginal distribution of the data. Furthermore, the proposed approach which naturally extends to the out-of-sample data is an inductive learning method in nature.

20 Claims, 5 Drawing Sheets

SEMI-SUPERVISED LEARNING BASED ON SEMIPARAMETRIC REGULARIZATION

This invention was made with government support under contract IIS0535162 awarded by NSF, contract FA8750-05-2-0284 awarded by AFRL and contract FA9550-06-1-0327 awarded by USAF/AFOSR. The government has certain rights in the invention.

1 INTRODUCTION

Semi-supervised learning attempts to use the unlabeled data to improve the performance. The labeled data are often expensive to obtain since they require the efforts of experienced experts. Meanwhile, the unlabeled data are relatively easy to collect. Semi-supervised learning has attracted considerable attention in recent years and many methods have been proposed to utilize the unlabeled data. Most of the semisupervised learning models are based on the cluster assumption which states that the decision boundary should not cross the high density regions, but instead lie in the low density regions. In other words, similar data points should have the same label and dissimilar data points should have different labels.

The present approach is also based on the cluster assumption. Moreover, the marginal distribution of the data is advantageously determined by the unlabeled examples if there is a small labeled data set available along with a relatively large unlabeled data set, which is the case for many applications. The geometry of the marginal distribution must be considered such that the learned classification or regression function adapts to the data distribution. An example is shown in FIGS. 1A and 1B for a binary classification problem. In FIG. 1A, the decision function is learned only from the labeled data and the unlabeled data are not used at all. Since the labeled data set is very small, the decision function learned cannot reflect the overall distribution of the data. On the other hand, the marginal distribution of the data described by the unlabeled data has a particular geometric structure. Incorporating this geometric structure into the learning process results in a better classification function, as shown in FIG. 1B.

The above observation suggests that the unlabeled data help change the decision function towards the desired direction. Therefore, the question remains: How to incorporate the geometric structure of the marginal distribution of the data into the learning such that the resulting decision function $\tilde{f}$ reflects the distribution of the data?

A variety of graph based methods are proposed in the literature to achieve this goal. The approach herein exploits the geometric structure in a different way. This is achieved by a 2-step learning process. The first step is to obtain a parametric function from the unlabeled data which describes the geometric structure of the marginal distribution. This parametric function is obtained by applying Kernel Principal Component Analysis (KPCA) algorithm to the whole data including the labeled and unlabeled data. In KPCA, the function to extract the most important principal component is a linear combination of the kernel functions in the Reproducing Kernel Hilbert Space (RKHS), $f(x)=K(x,.)\alpha$, where K is a kernel function and $\alpha$ is the coefficients vector. This learned parametric function can be shown to reflect the geometric structure of the marginal distribution of the data. The second step is a supervised learning on the labeled data. To incorporate this parametric function into the supervised learning, the original RKHS is extended to be used in the supervised learning by including this parametric function learned from the whole data.

Consequently, this approach is called a semiparametric regularization based semi-supervised learning. By selecting different loss functions for the supervised learning, different semi-supervised learning frameworks are obtained. Primary focus is given to two families of the algorithms: the semiparametric regularized Least Squares (hereinafter SpRLS) and the semiparametric regularized Support Vector Machines (hereinafter SpSVM). These algorithms demonstrate the state-of-the-art performance on a variety of classification tasks.

The present invention provides a semi-supervised learning approach which incorporates the unlabeled data into the supervised learning by a parametric function learned from the whole data including the labeled and unlabeled data.

This parametric function reflects the geometric structure of the marginal distribution of the data. Furthermore, the proposed approach which naturally extends to the out-of-sample data is an inductive learning method in nature. It also allows a family of algorithms to be developed based on various choices of the original RKHS and the loss function. Experimental comparisons show that the present approach leads the state-of-the-art performance on a variety of classification tasks. In particular, this approach can be used successfully in both transductive and semi-supervised settings.

2 RELATED WORK

The idea of regularization has a rich mathematical history dating back to Tikhonov [15] where it is used for solving ill-posed inverse problems. Many machine learning algorithms, including SVM, can be interpreted as examples of regularization. Many existing semi-supervised learning methods rely on the cluster assumption directly or indirectly and exploit the regularization principle by considering additional regularization terms on the unlabeled data. Zhu [20] has an excellent literature survey on the semi-supervised learning. TSVM [16] may be considered as SVM with an additional regularization term on the unlabeled data. Xu et al. [17] propose a TSVM training method based on semi-definite programming. Szummer et al. [14] propose an information regularization framework to minimize the mutual information on multiple overlapping regions covering the data space. The idea is that labels should not change too much in a high density region. Chapelle et al. [6] exploit the same principle. Grandvalet et al. [7] use the entropy on the unlabeled data as a regularizer. These methods implement the cluster assumption indirectly.

Graph-based methods [3, 21, 9, 5, 13, 19, 8, 18, 11] assume the label smoothness constraint over a graph where the nodes represent the labeled and unlabeled examples and the edges reflect the similarities of the examples. Belkin et al. [2] propose a data-dependent manifold regularization term approximated on the basis of the labeled and unlabeled data using the graph associated with the data. In their approach, the geometric structure of the marginal distribution is extracted using the graph Laplacian associated with the data. In the present approach, the geometric structure is described by a parametric function obtained from the whole data including the labeled and unlabeled data. According to a 2-step learning process according to an embodiment of the present invention, the classification function has the same form as that in [2] the same kernel is used. However, different methods are used to obtain the coefficients. This will be discussed in greater detail below.

Kernel methods [12, 16] have been widely used in the machine learning community. The semi-supervised learning on the kernel methods becomes very popular in recent years [2, 1, 13, 10]. Sindhwani et al. [13] give a data-dependent non-parametric kernel. They propose to warp an RKHS to adapt to the geometry of the data and derive a modified kernel defined in the same space of the functions as the original RKHS, but with a different norm. Building on [13], Altun et al. [1] propose a graph-based semi-supervised learning framework for structured variables. The present technique warps an RKHS in a different way. The original RKHS is extended to be used in the supervised learning by including a parametric function learned from the whole data such that the learned decision function reflects the data distribution. In some cases, this parametric function belongs to the original RKHS and thus the RKHS is not changed. However, the learned classification function still reflects the data distribution. This will also be discussed in detail below.

SUMMARY OF THE INVENTION

Semi-supervised learning plays an important role in the recent literature of machine learning and data mining and the developed semi-supervised learning techniques have lead to many data mining applications in recent years.

Labeled data required for a supervised learning technique are often expensive to obtain because they require the efforts of experienced experts. Meanwhile, unlabeled data are relatively easy to collect. Semi-parametric regularization semi-supervised learning attempts to use the unlabeled data to improve the performance.

The semi-supervised learning problem is addressed by developing a semi-parametric regularization based approach, which attempts to discover the marginal distribution of the data to learn the parametric function through exploiting the geometric distribution of the data. This learned parametric function is then incorporated into the supervised learning on the available labeled data as the prior knowledge. A semi-supervised learning approach which incorporates the unlabeled data into the supervised learning by a parametric function learned from the whole data set including the labeled and unlabeled data. The parametric function reflects the geometric structure of the marginal distribution of the data. Furthermore, the present approach which naturally extends to the out-of-sample data is an inductive learning method in nature. This approach allows a family of algorithms to be developed based on various choices of the original RKHS and the loss function. Experimental comparisons show that the present technique leads the state-of-the-art performance on a variety of classification tasks. In particular, this approach can be used successfully in both transductive and semi-supervised settings.

3 SUPERVISED LEARNING

A brief review of the supervised learning is now provided. Suppose that there is a probability distribution $P$ on $\mathcal{X} \times \mathcal{Y}$, $\mathcal{X} \subset \mathbb{R}^n$ according to which data are generated. Assuming that the given data consist of l labeled data points $(x_i, y_i)$, $1 \leq i \leq l$ which are generated according to $P$. The binary classification problem is assumed where the labels $y_i$, $1 \leq i \leq l$ are binary, i.e., $y_i = \pm 1$. In the supervised learning scenario, the goal is to learn a function f to minimize the expected loss called risk functional $$R(f) = \int L(x, y, f(x)) dP(x, y) \quad (3.1)$$

where L is a loss function. A variety of loss functions have been considered in the literature. The simplest loss function is 0/1 loss $$L\left(x_i, y_i, (f(x_i))\right) = \begin{cases} 0 & \text{if } y_i = f(x_i) \\ 1 & \text{if } y_i \neq f(x_i) \end{cases} \quad (3.2)$$

In Regularized Least Square (RLS), the loss function is given by $$L(x_i, y_i, (f(x_i))) = (y_i - f(x_i))^2$$

In SVM, the loss function is given by $$L(x_i, y_i, (f(x_i))) = \max(0, 1 - y_i f(x_i))$$

For the loss function Eq. (3.2), Eq. (3.1) determines the probability of a classification error for any decision function f. In most applications the probability distribution P is unknown. The problem, therefore, is to minimize the risk functional when the probability distribution function P(x,y) is unknown but the labeled data $(x_i, y_i)$, $1 \leq i \leq l$ are given. Thus, the empirical estimate of the risk functional is considered [16]

$$R_{emp}(f) = C \sum_{i=1}^{l} L(x_i, y_i, f(x_i)) \quad (3.3)$$

where C>0 is a constant. C=1/l is often used. Minimizing the empirical risk Eq. (3.3) may lead to numerical instabilities and bad generalization performance [12]. A possible way to avoid this problem is to add a stabilization (regularization) term $\Theta(f)$ to the empirical risk functional. This leads to a better conditioning of the problem. Thus, the following regularized risk functional is considered $$R_{reg}(f) = R_{emp}(f) + \gamma \Theta(f)$$

where $\gamma > 0$ is the regularization parameter which specifies the tradeoff between minimization of $R_{emp}(f)$ and the smoothness or simplicity enforced by small $\Theta(f)$. A choice of $\Theta(f)$ is the norm of the RKHS representation of the feature space $\Theta(f) = \|f\|_K^2$ where $\|\bullet\|_K$ is the norm in the RKHS $\mathcal{H}_K$ associated with the kernel K. Therefore, the goal is to learn the function f which minimizes the regularized risk functional $$f^* = \arg\min_{f \in \mathcal{H}_K} C \sum_{i=1}^{l} L(x_i, y_i, f(x_i)) + \gamma \|f\|_K^2 \quad (3.4)$$

The solution to Eq. (3.4) is determined by the loss function L and the kernel K. A variety of kernels have been considered in the literature. Three most commonly-used kernel functions are listed in the Table 1 where $\sigma > 0$, $\kappa > 0$, $\vartheta < 0$. The following classic Representer Theorem [12] states that the solution to the minimization problem Eq. (3.4) exists in $\mathcal{H}_K$ and gives the explicit form of a minimizer.

THEOREM 3.1. Denote by $\Omega: [0, \infty) \to \mathbb{R}$ a strictly monotonic increasing function, by $\mathcal{X}$ a set and by $\Lambda: (\mathcal{X} \times \mathbb{R}^2)^l \to \mathbb{R} \cup \{\infty\}$ an arbitrary loss function. Then each minimizer $f \in \mathcal{H}_K$ of the regularized risk $$\Lambda((x_1, y_1, f(x_1)), \ldots, (x_l, y_l, f(x_l))) + \Omega(\|f\|_K)$$

admits a representation of the form $$f(x) = \sum_{i=1}^{l} \alpha_i K(x_i, x) \quad (3.5)$$

with $\alpha_i \in \mathbb{R}$.

According to Theorem 3.1, we can use any regularizer in addition to $\gamma\|f\|_K^2$ which is a strictly monotonic increasing function of $\|f\|_K$. This allows us in principle to design different algorithms. the simplest approach to use the regularizer may be adopted $\Omega(\|f\|_K)=\gamma\|f\|_K^2$.

Given the loss function L and the kernel K, we substitute Eq. (3.5) into Eq. (3.4) to obtain a minimization problem of the variables $\alpha_i$, $1 \leq i \leq l$. The decision function f* is immediately obtained from the solution to this minimization problem.

4 SEMI-SUPERVISED LEARNING

In the semi-supervised learning scenario, in addition to l labeled data points $(x_i,y_i)$, $1 \leq i \leq l$ u unlabeled data points $X_i$, $l+1 \leq i \leq l+u$ are given which are drawn according to the marginal distribution $P_X$ of P. The decision function is learned from both the labeled data and the unlabeled data. The semi-supervised learning attempts to incorporate the unlabeled data into the supervised learning in different ways. A semi-supervised learning approach is provided based on semiparametric regularization which extends the original RKHS by including a parametric function learned from the whole data including the labeled and unlabeled data.

4.1 SEMIPARAMETRIC REGULARIZATION

In the supervised learning, additional prior knowledge may be available about the solution in many applications. In particular, a specific parametric component may be known that is very likely to be a part of the solution. Or the data may be corrected for some (e.g., linear) trends to avoid the overfitting. The overfitting degrades the generalization performance when there are outliers.

Suppose that this additional prior knowledge is described as a family of parametric functions $\{\psi_p\}_{p=1}^M : \Psi \to \mathbb{R}$. These parametric functions may be incorporated into the supervised learning in different ways. The following regularized risk functional is considered $$\bar{f}^* = \arg\min_{\bar{f}} C \sum_{i=1}^{l} L(x_i, y_i, \bar{f}(x_i)) + \gamma\|f\|_K^2 \quad (4.6)$$

where $\bar{f} := f+h$ with $f \in \mathcal{H}_K$ and $h \in \text{span}\{\psi p\}$. Consequently, the original RKHS $\mathcal{H}_K$ is extended by including a family of parametric functions $\psi_p$ without changing the norm. The semiparametric representer theorem [12] tells us the explicit form of the solution to Eq. (4.6). The following semiparametric representer theorem is an immediate extension of Theorem 3.1.

THEOREM 4.1. Suppose that in addition to the assumptions of Theorem 3.1 we are given a set of M real valued functions $\{\psi_p\}_{p=1}^M : \chi \to \mathbb{R}$, with the property that the l×M matrix $(\psi_p(x_i))_{ip}$ has rank M. Then for any $\bar{f} := f+h$ with $f \in \mathcal{H}_K$ and $h \in \text{span}\{\psi p\}$, minimizing the regularized risk $$\Lambda((x_1,y_1,f(x_1)), \ldots, (x_l,y_l,f(x_l))) + \Omega(\|f\|_K)$$

admits a representation of the form $$\bar{f}(x) = \sum_{i=1}^{l} \alpha K(x_i, x) + \sum_{p=1}^{M} \beta_p \psi_p(x) \quad (4.7)$$

with $\alpha_i, \beta_p \in \mathbb{R}$, .

In Theorem 4.1, the parametric functions $\{\psi_p\}_{p=1}^M$ can be any functions. The simplest parametric function is the constant function $\psi_1(x)=1$, M=1 as in the standard SVM model where the constant function is used to maximize the margin.

In Eq. (4.6), the family of parametric functions $\{\Omega_p\}_{p=1}^M$ do not contribute to the standard regularizer $\|f\|_K^2$. This need not be a major concern if M is sufficiently smaller than l. Advantageously, M=1 is used, and this parametric function is learned from the whole data including the labeled and unlabeled data. Therefore, the l×M matrix $(\psi_p(x_i))_{ip}$ is a vector whose rank is 1. $\psi(x)$ denotes this parametric function and by $\beta$ the corresponding coefficient. Thus, the minimizer of Eq. (4.6) is $$\bar{f}^*(x) = \sum_{i=1}^{l} \alpha^* K(x_i, x) + \beta^* \psi(x) \quad (4.6)$$

where K is the kernel in the original RKHS $\mathcal{H}_K$.

4.2 LEARNING PARAMETRIC FUNCTION $\psi(x)$ is obtained by applying the KPCA algorithm [12] to the whole data set. The KPCA algorithm finds the principal axes in the feature space which carry more variance than any other directions by diagonalizing the covariance matrix $$C = \frac{1}{l+u}\sum_{j=1}^{l+u} \Phi(x_j)\Phi(x_j)^T$$

where $\Phi$ is a mapping function in the RKHS. To find the principal axes, the eigenvalue problem is solved, $(l+u)\lambda\gamma = K_u\gamma$, where $K_u$ is the kernel used. Let $\lambda$ denote the largest eigenvalue of $K_u$ and $\gamma$ the corresponding eigenvector. Then the most important principal axis is given by $$V = \sum_{i=1}^{l+u} \gamma_i \Phi(x_i) \quad (4.9)$$

Usually v is normalized such that $\|v\|=1$. Given the data point x, the projection onto the principal axis is given by $<\Phi(x), v>$. Let $\psi(x) = <\Phi(x), v> = K_u(x, .)\gamma$. FIG. 2 shows an illustrative example for the binary classification problem. As shown in this example, $\psi(x)$ might not be the desired classification function. However, $\psi(x)$ is parallel to the desired classification function (the dashed line). They are different up to a constant. Therefore, $\psi(x)$ reflects the geometric structure of the distribution of the data. From this example, it is clear that the data points projected onto the most important principal axis still keep the original neighborhood relationship. In other words, after projection on the principal axis, similar data points stay close and dissimilar data points are kept far away from each other. In the ideal case of separable binary class problem, the following theorem is applied which says that the similar data points in the feature space are still similar to each other after projected on the principal axis.

THEOREM 4.2. Denote by $C_i$, i=0, 1 the set of the data points of each class in the binary class problem. Suppose $C_i = \{x | \|\Phi(x)-c_i\| \leq r_i\}$ and $\|c_0-c_1\| > r_0+r_1$. For each class, suppose that the data points are uniformly distributed in the sphere of radius $r_i$. $\|.\|$ denotes the Euclidean norm and v denotes the principal axis derived from KPCA as defined in Eq. (4.9). Then $$\forall p \in C_i, v^T \Phi(p) \in R_i, i=0,1$$

where $R_i = [\mu_i - r_i, \mu_i + r_i]$ and $\mu_i = v^T c_i$. Moreover, $R_0$ and $R_1$ do not overlap.

Proof. Suppose that the number of the data points in the class $C_i$ is $n_i$, respectively. Any data point in the class $C_i$ can be expressed as $\Phi(x) = c_i + r_i t$ where $\|t\| \leq 1$. Denote by y the projection on the principal axis, $y = v^T \Phi(x)$. Therefore, $y = v^T c_i + r_i v^T t$. Since $\|v\| = 1$, $|v^T t| \leq 1$. Thus, the range of y in the class $C_i$ is $[\mu_i - r_i, \mu_i + r_i]$. Because the sphere is symmetric and the data points are uniformly distributed, the mean of y in the class $C_i$ is $\mu_i$. Denote by $\delta_i$, i=0, 1, the variance of y in each class. Note $\delta_i$ is invariant to the projection direction. The reason is again that the sphere is symmetric and the data points are uniformly distributed.

Therefore, the overall mean of all y is $$\mu = \frac{n_0 \mu_0 + n_1 \mu_1}{n_0 + n_1}$$

and the overall variance is $$\begin{aligned}\delta &= \frac{1}{n_0 + n_1} \sum_y (y - \mu)^2 \\ &= \frac{1}{n_0 + n_1} \left[ \sum_{y \in C_0} (y - \mu)^2 + \sum_{y \in C_1} (y - \mu)^2 \right] \\ &= \frac{1}{n_0 + n_1} \left[ \sum_{y \in C_0} \left( y - \mu_0 + \frac{n_1}{n_0 + n_1} (\mu_0 - \mu_1) \right)^2 + \right. \\ &\quad \left. \sum_{y \in C_1} \left( y - \mu_1 + \frac{n_0}{n_0 + n_1} (\mu_1 - \mu_0) \right)^2 \right] \\ &= \frac{n_0}{n_0 + n_1} \delta_0 + \frac{n_1}{n_0 + n_1} \delta_1 + \frac{n_0 n_1}{(n_0 + n_1)^2} (\mu_1 - \mu_0)^2\end{aligned}$$

It can be shown that the ranges of y of the two classes on the principal axis derived from the KPCA do not overlap. First of all, there exists a projection axis such that these two ranges do not overlap. Conceptually, consider the projection axis $$\frac{c_1 - c_0}{\|c_1 - c_0\|}.$$

Then $$\tilde{\mu}_o = \frac{1}{\|c_1 - c_0\|} (c_1 - c_0)^T c_0 \text{ and } \tilde{\mu}_1 = \frac{1}{\|c_1 - c_0\|} (c_1 - c_0)^T c_1.$$

Thus, $\tilde{\mu}_1 - \tilde{\mu}_2 = \|(c_1 - c_0)\| > r_0 + r_1$.

Therefore, these two ranges do not overlap. Denote by $\tilde{\delta}$ the variance in this case. Next, a formal proof is given below by contradiction.

Suppose that these two ranges were to overlap under the principal axis derived from the KPCA. Thus, $\|\mu_1 - \mu_0\| < r_0 + r_1$. Consequently, $\delta < \tilde{\delta}$ since $\delta_0$, $\delta_1$ are invariant to the projection axis. This is a contradiction since the variance on the principal axis derived from the KPCA should be the maximum among all the projection axes. Hence, these two ranges do not overlap on the principal axis v derived from the KPCA.

Based on the above analysis, semi-supervised learning is achieved by a 2-step learning process. The first step is to obtain a parametric function $\psi(x)$ from the whole data. Since this parametric function $\psi(x)$ is obtained by KPCA, $\psi(x)$ reflects the geometric structure of the marginal distribution of the data revealed by the whole data. This implements cluster assumption indirectly. The second step is to solve Eq. (4.6) on a new function space to obtain the final classification function.

If $K_u = K$, the final classification function has the form $$\bar{f}(x) = \sum_{i=1}^{l+u} \alpha'_i K(x_i, x)$$

where $\alpha'_i$ is the linear combination of $\alpha_i$ and $\beta$. This classification function has the same form as that in [2]. But the methods to obtain it are different. In this case, the parametric function belongs to the original RKHS. Adding $\psi(x)$ does not change the RKHS, but guides the learned classification function towards the desired direction described by $\psi(x)$. If $K_u$ and K are two different kernels, the original RKHS is extended by $\psi(x)$.

The coefficient $\beta^*$ reflects the weight of the unlabeled data in the learning process. When $\beta^* = 0$, the unlabeled data are not considered at all and this method is a fully supervised learning algorithm. This means that the unlabeled data do not provide any useful information. In other words, the unlabeled data follow the marginal distribution described by the labeled data. When $\beta^* \neq 0$, the unlabeled data provide the useful information about the marginal distribution of the data and the geometric structure of the marginal distribution revealed by the unlabeled data is incorporated into the learning.

To learn the final classification function, Eq. (4.8) is substituted into Eq. (4.6) to obtain an objective function of $\alpha^*_i$ and $\beta^*$. The solution of $\alpha^*_i$ and $\beta^*$ depends on the loss function. Different loss functions L result in different algorithms. Two typical loss functions are discussed: the squared loss for RLS and the hinge loss for SVM. For the squared loss function, the explicit form of $\alpha^*_i$ and $\beta^*$ are obtained. In the following sections, K is used interchangeably to denote the kernel function or the kernel matrix.

4.3 SEMIPARAMETRIC REGULARIZED LEAST SQUARES

The RLS approach is first outlined which applies to the binary classification and the regression problem. The classic RLS algorithm is a supervised method where the following is solved:

$$f^* = \arg \min_{f \in \mathcal{H}_K} C \sum_{i=1}^{l} (y_i - f(x_i))^2 + \gamma \|f\|_K^2$$

where C and $\gamma$ are the constants.

According to Theorem 3.1, the solution is of the following form $$f^*(x) = \sum_{i=1}^{l} \alpha^*_i K(x_i, x)$$

Substituting this solution in the problem above, the following differentiable objective function of the l-dimensional variable $\alpha=[\alpha_1 \ldots \alpha_l]^T$:

$$\alpha^* = \arg\min C(Y-K\alpha)^T(Y-K\alpha)+\gamma\alpha^T K\alpha$$

where K is the l×l kernel matrix $K_{ij}=K(x_i,x_j)$ and Y is the label vector $Y=[y_1 \ldots y_l]^T$.

The derivative of the objective function over α vanishes at the minimize $C(KK\alpha^*-KY)+\gamma K\alpha^*=0$ which leads to the following solution.

$$\alpha^* = (CK+\gamma I)^{-1}CY$$

The semiparametric RLS algorithm solves the optimization problem in Eq. (4.6) with the squared loss function:

$$\bar{f}^* = \arg\min_f C\sum_{i=1}^{l}(y_i - \bar{f}(x_i))^2 + \gamma\|f\|_K^2 \qquad (4.10)$$

where $\bar{f}:=f+h$ with $f \in \mathcal{H}_K$ and $h \in \text{span}\{\psi\}$.

According to Theorem 4.1, the solution has the form of $$\bar{f}^* = \sum_{i=1}^{l}\alpha_i^* K(x_i, x) + \beta^*\psi(x)$$

Substituting this form in Eq. (4.10), the following objective function of the l-dimensional variable $\alpha=[\alpha_1 \ldots \alpha_l]^T$ and β is arrived at:

$$(\alpha^*,\beta^*) = \arg\min C\delta^T\delta + \gamma\alpha^T K\alpha$$

where $\delta=Y-K\alpha-\beta\psi$, K is the l×l kernel matrix $K_{ij}=K(x_i,x_j)$, Y is the label vector $Y=[y_1 \ldots y_l]^T$, and ψ is the vector $\psi=[\psi(x_1) \ldots \psi(x_l)]^T$. The derivatives of the objective function over α and β vanish at the minimizer:

$$C(KK\alpha^* + \beta^* K\psi - KY) + \gamma K\alpha^* = 0$$

$$\psi^T K\alpha^* + \beta^*\psi^T\psi - \psi^T Y = 0$$

which lead to the following solution:

$$\alpha^* = C\left(\gamma I - \frac{C\psi\psi^T K}{\psi^T\psi} + CK\right)^{-1}\left(I - \frac{\psi\psi^T}{\psi^T\psi}\right)Y \qquad (4.11)$$

$$\beta^* = \frac{\psi^T Y - \psi^T K\alpha^*}{\psi^T\psi}$$

4.4 SEMIPARAMETRIC REGULARIZED SUPPORT VECTOR MACHINES

The SVM approach to the binary classification problem is now outlined. In the binary classification problem, the classic SVM attempts to solve the following optimization problem on the labeled data.

$$\min \frac{1}{2}\|w\|^2 + C\sum_{i=1}^{l}\xi_i \qquad (4.12)$$

$$\text{s.t.} \quad y_i(\langle w, \Phi(x_i)\rangle + b) \geq 1 - \xi_i$$
$$\xi_i \geq 0 \quad i=1,\ldots,l$$

where Φ is a nonlinear mapping function determined by the kernel and b is a regularized term. Again, the solution is given by $$f^*(x) = \langle w, \Phi(x_i)\rangle + b^* = \sum_{i=1}^{l}\alpha_i^* K(x_i, x) + b^*$$

To solve Eq. (4.12) one Lagrange multiplier is introduced for each constraint in Eq. (4.12) using the Lagrange multipliers technique and obtain a quadratic dual problem of the Lagrange multipliers.

$$\min \frac{1}{2}\sum_{i,j=1}^{l}y_iy_j\mu_i\mu_j K(x_i, x_j) - \sum_{i=1}^{l}\mu_i \qquad (4.13)$$

$$\text{s.t.} \quad \sum_{i=1}^{l}\mu_i y_i = 0$$
$$0 \leq \mu_i \leq C \quad i=1,\ldots,l$$

where $\mu_i$ is the Lagrange multiplier associated with the i-th constraint in Eq. (4.12).

$W^* = \sum_{i=1}^{l}\mu_i y_i \Phi(x_i)$ results from the solution to Eq. (4.13). Note that the following conditions must be satisfied according to the Kuhn-Tucker theorem [16]:

$$\mu_i(y_i(\langle w,\Phi(x_i)\rangle + b) + \xi_i - 1) = 0 \quad i=1,\ldots,l \qquad (4.14)$$

The optimal solution of b is determined by the above conditions.

Therefore, the solution is given by $$f^*(x) = \sum_{i=1}^{l}\alpha_i^* K(x_i, x) + b^*$$

where $\alpha_i^* = \mu_i y_i$.

The semiparametric SVM algorithm solves the optimization problem in Eq. (4.6) with the hinge loss function:

$$\min \frac{1}{2}\|w\|^2 + C\sum_{i=1}^{l}\xi_i \qquad (4.15)$$

$$\text{s.t.} \quad y_i\{\langle w, \Phi(x_i)\rangle + b\psi(x_i)\} \geq 1 - \xi_i$$
$$\xi_i \geq 0 \quad i=1,\ldots,l$$

As in the classic SVM, the Lagrange dual problem is considered for Eq. (4.15).

$$\min \frac{1}{2}\sum_{i,j=1}^{l}y_iy_j\mu_i\mu_j K(x_i, x_j) - \sum_{i=1}^{l}\mu_i \qquad (4.16)$$

$$\text{s.t.} \quad \sum_{i=1}^{l}\mu_i y_i = 0$$
$$\sum_{i=1}^{l}\mu_i y_i \psi(x_i) = 0$$
$$0 \leq \mu_i \leq C \quad i=1,\ldots,l$$

where $\mu_i$ is the Lagrange multiplier associated with the $i^{th}$ constraint in Eq. (4.15). The semiparametric SVM dual problem Eq. (4.16) is the same as the SVM dual problem Eq. (4.13) except one more constraint introduced by the paramet ric function $\psi(x)$. As in the classic SVM, the following conditions must be satisfied:

$$\mu_i(y_i(\langle w,\Phi(x_i)\rangle + b + \beta\psi(x_i)) + \xi_i - 1) = 0 \qquad (4.17)$$

$W^* = \sum_{i=1}^{l} \mu_i y_i \Phi(x_i)$ results from the solution to Eq. (4.16). This is the same as that in the SVM.

The optimal solution of $b^*$ and $\beta^*$ is determined by Eq. (4.17). If the number of the Lagrange multipliers satisfying $0 < \mu^i < C$ is no less than two, $b^*$ and $\beta^*$ may be determined by solving two linear equations corresponding to any two of them in Eq. (4.17) since the corresponding slack variable $\xi_i$ is zero. In the case that the number of the Lagrange multipliers satisfying $0 < \mu_i < C$ is less than two, $b^*$ and $\beta^*$ are determined by solving the following optimization problem derived from Eq. (4.17).

$$\min b_2 \beta_2$$

$$s.t.\ y_i\{\langle w,\Phi(x_i)\rangle + b + \beta\psi(x_i)\} \geq 1$$

$$\text{if } \mu_1 = 0$$

$$y_i\{\langle w,\Phi(x_i)\rangle + b + \beta\psi(x_i)\} = 1$$

$$\text{if } 0 < \mu_i < C \qquad (4.18)$$

The final decision function is $$f^*(x) = \sum_{i=1}^{l} \alpha_i^* K(x_i, x) + \beta^* \psi(x) + b^*$$

where $\alpha^*_i = \mu_i y_i$. Semiparametric SVM can be implemented by using a standard quadratic programming problem solver.

4.5 SEMIPARAMETRIC REGULARIZATION ALGORITHM

Based on the above analysis, the semiparametric regularization algorithm is summarized in Algorithm 1.

Algorithm 1: Semiparametric Regularization Algorithm
Input:
l labeled data points $(x_i, y_i)$, $1 \leq i \leq l$, $y_i = \pm 1$ and u unlabeled data points $x_i$, $l+1 \leq i \leq l+u$
Output:
Estimated function $$f^*(x) = \sum_{i=1}^{l} \alpha_i^* K(x_i, x) + \beta^* \psi(x)$$

for SpRLS or $$f^*(x) = \sum_{i=1}^{l} \alpha_i^* K(x_i, x) + \beta^* \psi(x) + b^*$$

for SpSVM.
1: procedure
2: Choose the kernel $K_u$ and apply KPCA to the whole data to obtain the parametric function $$\sum_{i=1}^{l+u} \gamma_i K_u(x_i, x).$$

3: Choose the kernel K and solve Eq(4.11) for SpRLS or Eqs. (4.16) and (4.18) for SpSVM.
4: end procedure 4.6 TRANSDUCTIVE LEARNING AND SEMI-SUPERVISED LEARNING The transductive learning only works on the labeled and unlabeled training data and cannot handle unseen data. Out-of-sample extension is already a serious limitation for transductive learning. Contrast to the transductive learning, the inductive learning can handle unseen data. The semisupervised learning can be either transductive or inductive. Many existing graph-based semi-supervised learning methods are transductive in nature since the classification function is only defined on the labeled and unlabeled training data. One reason is that they perform the semi-supervised learning only on the graph where the nodes are the labeled and unlabeled data in the training set, not on the whole space.

According to an embodiment of the present invention, the decision function Eq. (4.8) is defined over the whole $\chi$ space. Therefore, the approach is inductive in nature and can extend to the out-of-sample data.

4.7 COMPARISONS WITH OTHER METHODS

In the literature, many existing semi-supervised learning methods rely on the cluster assumption directly or indirectly and exploit the regularization principle by considering additional regularization terms on the unlabeled data. Belkin et al. [2] propose a manifold regularization approach where the geometric structure of the marginal distribution is extracted using the graph Laplacian associated with the data. They considered the following regularization term.

$$\sum_{i,j=1}^{l+u} (f(x_i) - f(x_j))^2 W_{ij} = f^T L f \qquad (4.19)$$

where $W_{ij}$ are edge weights in the data adjacency graph and L is the graph Laplacian given by $L = D - W$. Here, the diagonal matrix D is given by $$D_{ii} = \sum_{j=1}^{l+u} W_{ij}.$$

The incorporation of this regularization term leads to the following optimization problem.

$$f^* = \arg\min_{f \in H_K} C \sum_{i=1}^{l} (x_i, y_i, f(x_i)) + \gamma \|f\|_K^2 + f^T L f$$

Eq. (4.19) attempts to give the nearby points (large $W_{ij}$) in the graph similar labels. However, the issue is that Eq. (4.19) tends to give the similar labels for points i and j as long as $W_{ij} > 0$. In other words, dissimilar points might have similar labels. Therefore, their approach depends on the neighborhood graph constructed from the data. Similarly, Zhu et al. [21] minimize Eq. (4.19) as an energy function.

The semiparametric regularization based semisupervised learning approach according to an embodiment of the present invention exploits the cluster assumption by the parametric function $\psi(x)$. Learned from the whole data, this parametric function reflects the geometric structure of the marginal distribution of the data. Different from the manifold regularization approach, the present approach uses a parametric function obtained from the whole data to describe the geometric structure of the marginal distribution. Similar to the manifold regularization approach, the present approach obtains the same form of the classification function if the same kernel ($K=K_u$) is used in the 2-step learning process. However, the methods to obtain the expansion coefficients are different.

Sindhwani et al. [13] derive a modified kernel defined in the same space of the functions as the original RKHS, but with a different norm. According to an embodiment of the present invention, an RKHS is warped in a different way. The original RKHS is extended by including the parametric function without changing the norm such that the learned decision function reflects the data distribution. In some cases, this parametric function belongs to the original RKHS and thus the RKHS is unchanged. However, the learned classification function still reflects the data distribution since the classification function has a preference to the parametric function according to Eq. (4.8).

The parametric function $\psi(x)$ learned by KPCA can be incorporated into the supervised learning to separate different classes very well for the binary classification problem. For the multiclass problem, KPCA cannot separate different class very well because some classes overlap after projection onto the principal axis, hence the focus herein on the binary class problem.

5 EXPERIMENT RESULTS

Figure 1A:
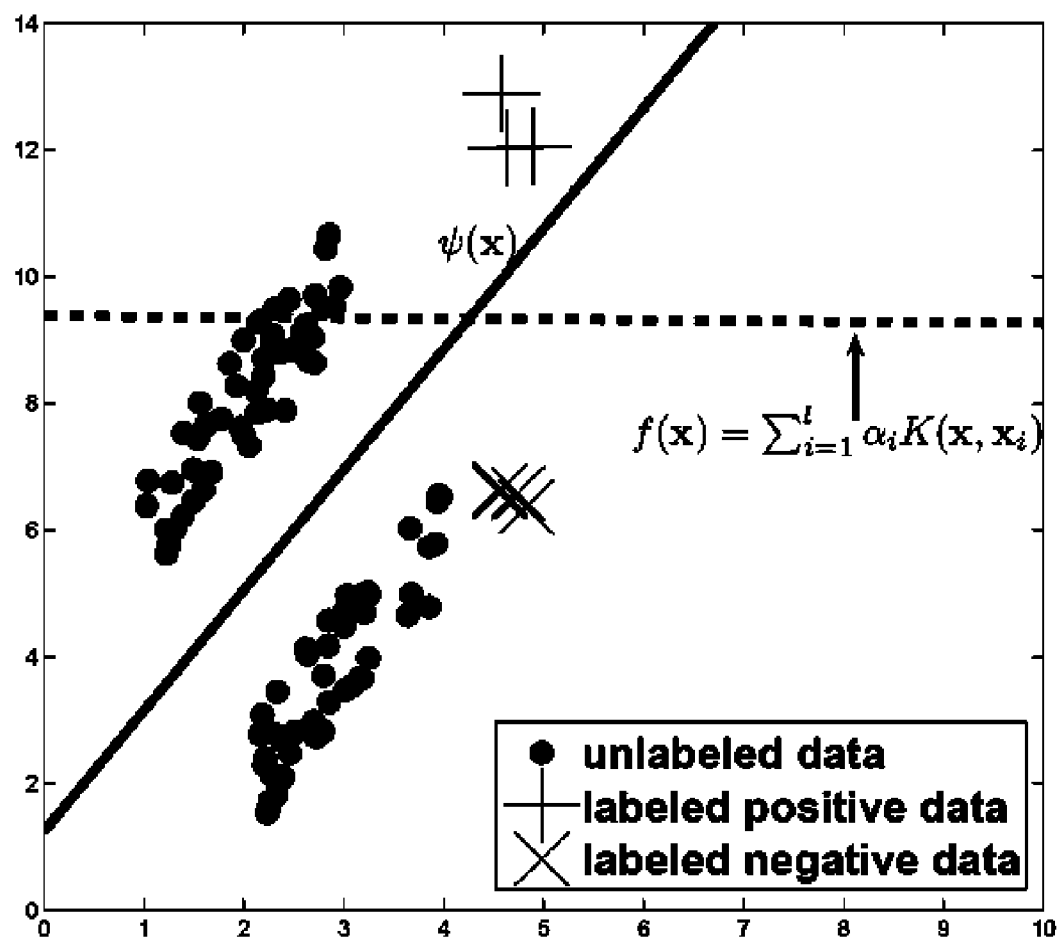
FIG. 1A shows a decision function (dashed line) learned only from a set of labeled data.
Figure 1B:
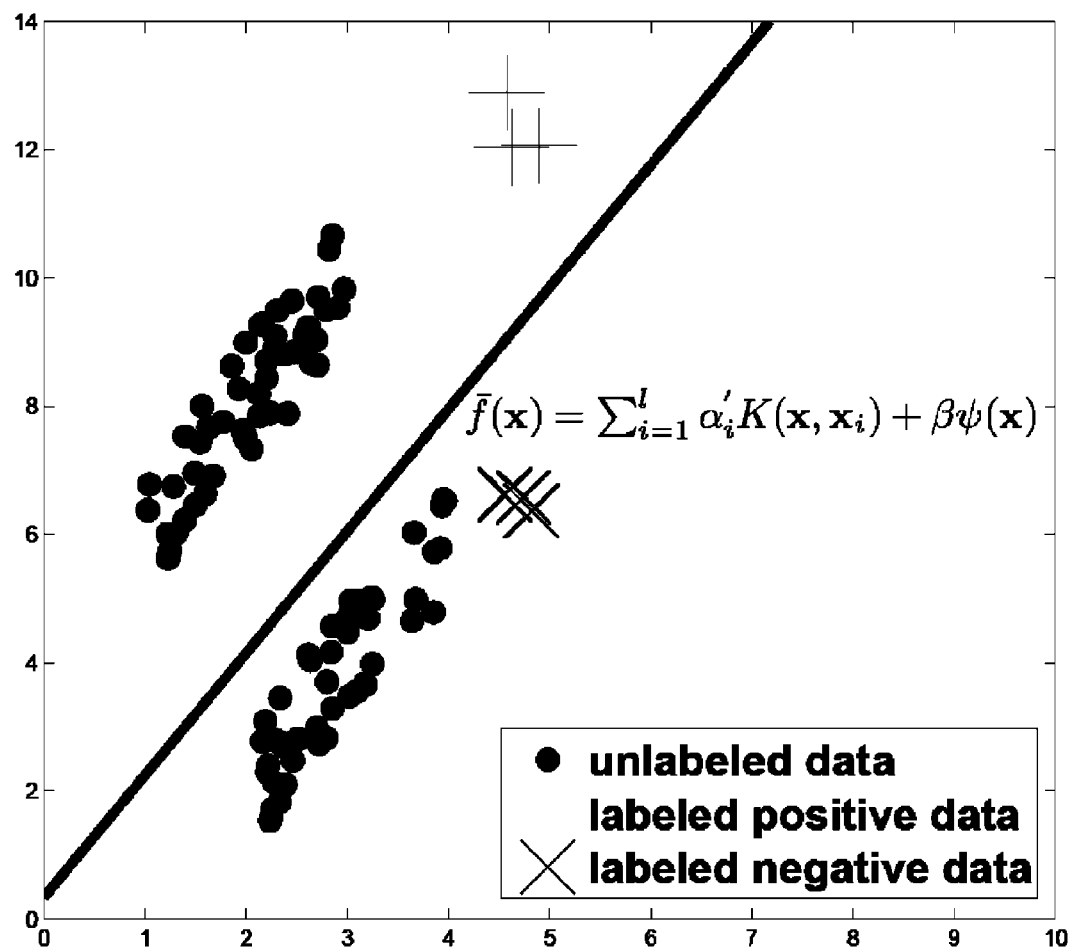
FIG. 1B shows a decision function (solid line) learned after unlabeled data are considered in addition to labeled data.
Figure 2:
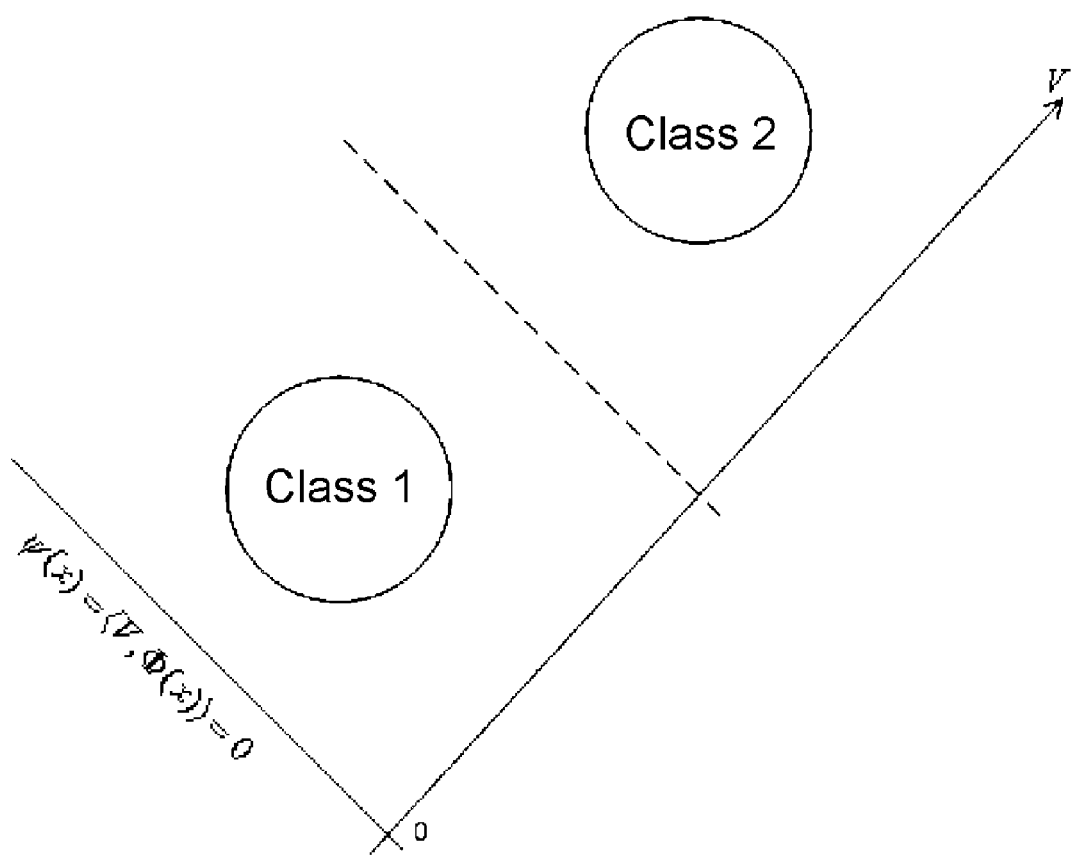
FIG. 2 illustrates a KPCA in two dimensions.

Experiments are performed on seven well-known datasets described in Table 2 where c is the number of classes, d is the data dimension, l is the number of the labeled data points, and n is the total number of the data points in the dataset including labeled, unlabeled, and test data points. The dataset g50c, mac-win and WebKb are from [13]. The dataset g241c and BCI are from [4]. g50c is an artificial dataset generated from two unit-covariance normal distributions with equal probabilities. g241c is artificially generated such that the cluster assumption holds, but the manifold assumption does not. mac-win is taken from the newsgroups20 dataset and the task is to categorize the newsgroup documents into two topics: mac or windows. BCI dataset originates from research toward the development of a brain computer interface. The WebKb dataset is a subset of the web documents of the computer science departments of four universities. The two categories are course or non-course. For each document, there are two representations: the textual content of the webpage (which is called page representation) and the anchor text on links on other webpages pointing to the webpage (which is called link representation). A joint (page+link) representation is also considered by concatenating the features.

SpRLS and SpSVM are compared with the methods in Sindhwani et al. [13] (thus called LapRLS and LapSVM for the reference purpose) as well as the original RLS and SVM in performance. In the experiments reported below, K is set as the same as $K_u$ as the Gaussian RBF kernel. For g50c, mac-win, and WebKb datasets, the same kernel parameters are used as those used in [13] which also uses the Gaussian RBF kernel and chooses the parameters using the cross-validation method. Sindhwani et al. [13] did not report the experimental results on g241c or BCI datasets. Therefore, the kernel parameters are chosen based on the performance on a small grid of parameter values and apply the same parameters to the LapSVM and LapRLS algorithms. The regularization parameters (e.g., C in the Eq. (4.15)) are chosen based on the performance on a small grid of parameter values, too.

In the transductive setting, the training set consists of n examples, l of which are labeled (n, l are specified in Table 2). Table 3 reports the results for predicting the labels of the n–l unlabeled data points under the transductive setting. The performance is evaluated by the error rates (mean and standard deviation) on the unlabeled data averaged over 10 runs with different random choices of the labeled set.

In the semi-supervised setting, the training set consists of l labeled data points and u unlabeled data points; the test set consists of n–l–u data points. Table 4 reports the results for predicting the labels of the unlabeled data and the test data for g50c, g241c, mac-win, and BCI datasets. Table 5 reports the results for WebKb dataset. The performance is evaluated again by the error rates averaged over 10 runs with different random choices of the labeled data and the unlabeled data.

In summary, the approach according to an embodiment of the present invention outperforms LapSVM and LapRLS in all the cases in the transductive setting except on the WebKb (page) dataset. In the semi-supervised setting, this approach outperforms LapSVM and LapRLS in all the cases. In both settings, SpRLS returns the best performance and outperforms SpSVM in most cases. One possible reason might be that MATLAB is used to solve the quadratic optimization problem in the SpSVM and MATLAB does not support quadratic optimization very well.

Figure 3:
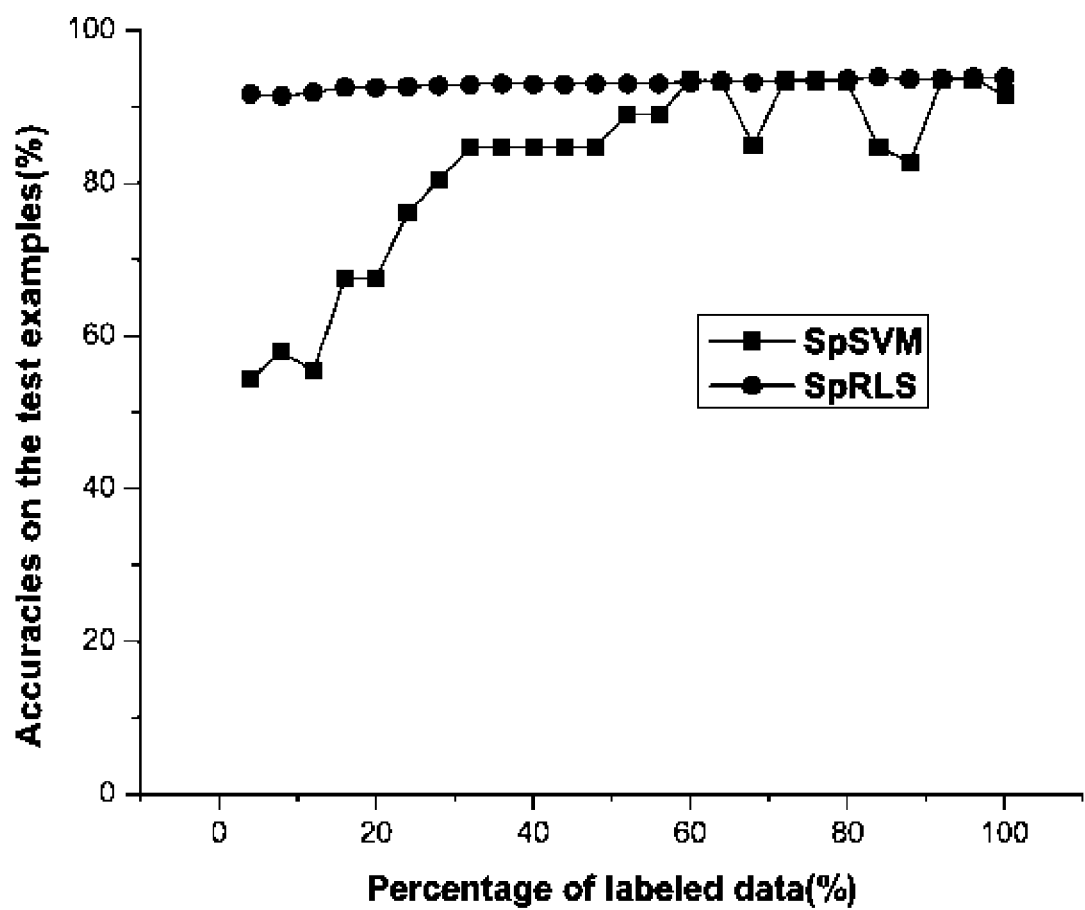
FIG. 3 shows accuracies on the test data with different percentages of the labeled data for the g50c dataset.
Figure 4:
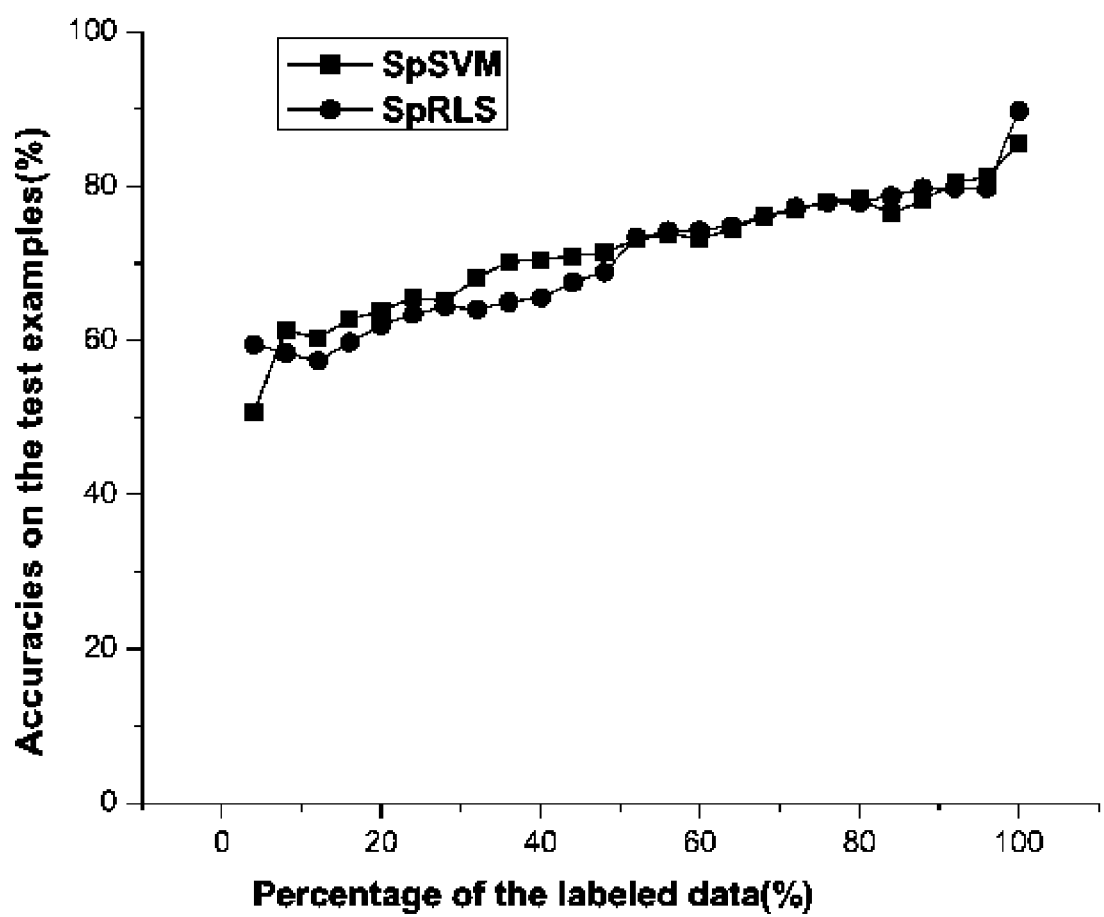
FIG. 4 shows accuracies on the test data with different percentages of the labeled data for the mac-win dataset.

The performance is also evaluated in terms of the accuracy on the test data with different percentages of the labeled data in the training set while keeping the size of the whole training set as a constant. The performance accuracy is defined as the correct percentage with respect to the ground truth. FIG. 3 reports the result on the g50c dataset and FIG. 4 reports the result on the mac-win dataset. SpRLS demonstrates a good performance even with a very few labeled data. For g50c dataset, SpRLS only needs two labeled data points (one for each class) to obtain a performance almost as good as that using 100 labeled data points. From this figure, it is clear that as long as a sufficiently few labeled data samples ($\geq 2\%$ for the g50c dataset and $\geq 24\%$ for the mac-win dataset) are available, this method ensures a satisfactory classification performance (around 70% accuracy).

TABLE 1

| most commonly-used kernel functions | |
|---|---|
| kernel name | kernel function |
| polynomial kernel | $K(x, x_i) = (\langle x, x_i \rangle + c)^d$ |
| Gaussian radial basis function kernel | $K(x, x_i) = \exp\left(\frac{\|x, x_i\|^2}{2\sigma^2}\right)$ |
| Sigmoid kernel | $K(x, x_i) = \tanh(\kappa \langle x, x_i \rangle + \nu)$ |

TABLE 2

Dataset used in the experiments

| Dataset | c | d | l | n |
|---|---|---|---|---|
| g50c | 2 | 50 | 50 | 550 |
| g241c | 2 | 241 | 50 | 1500 |
| mac-win | 2 | 7511 | 50 | 1946 |
| BCI | 2 | 117 | 50 | 400 |
| WebKb (page) | 2 | 3000 | 12 | 1051 |
| WebKb (link) | 2 | 1840 | 12 | 1051 |
| WebKb (page + link) | 2 | 4840 | 12 | 1051 |

TABLE 3

Transductive setting: Error rates on the unlabeled examples

| Dataset→<br>Algorithm↓ | g50c | g241c | mac-win | BCI | WebKB (link) | WebKB (page) | WebKB (page + link) |
|---|---|---|---|---|---|---|---|
| SVM(full labels) | 8.0(0.4) | 6.4(0.1) | 2.5(0.1) | 29.0(1.4) | 12.4(0.1) | 13.1(0.1)) | 10.5(0.1) |
| RLS(full labels) | 2.5(0.1) | 0(0) | 0(0) | 0(0) | 0.5(0) | 0.6(0) | 0.2(0) |
| LapSVM | 6.1(1.1) | 35.4(6.8) | 10.5(2.0) | 49.8(2.0) | 20.2(11.4) | 13.0(6.8) | 15.1(7.4) |
| LapRLS | 5.4(1.1) | 34.5(8.5) | 10.1(1.4) | 49.4(2.3) | 31.3(24.8) | 7.9(2.7) | 11.0(7.7) |
| SpSVM | 18.7(21.8) | 34.0(29.5) | 7.1(0.7) | 49.6(1.3) | 64.3(29.0) | 57.4(33.3) | 78.1(0.1) |
| SpRLS | 5.2(0.9) | 14.8(2.4) | 8.0(1.7) | 37.4(2.5) | 13.5(4.4) | 10.9(5.9) | 4.3(1.9) |

TABLE 4

Semi-supervised setting:
Error rates on the unlabeled and test examples for g50c, g241c, mac-win, and BCI datasets

| Dataset→ | g50c | | g241c | | mac-win | | BCI | |
|---|---|---|---|---|---|---|---|---|
| Algorithm↓ | unlabel | test | unlabel | test | unlabel | test | unlabel | test |
| SVM | 11.7(5.7) | 9.7(6.0) | 48.2(2.1) | 48.1(3.2) | 45.4(10.2) | 47.6(11.4) | 49.2(2.1) | 49.8(6.8) |
| RLS | 20.6(10.4) | 19.4(10.0) | 29.6(6.1) | 30.4(7.6) | 46.5(10.9) | 47.4(11.4) | 37.9(2.8) | 36.7(3.3) |
| LapSVM | 7.2(1.3) | 7.0(1.8) | 34.4(6.7) | 34.9(8.6) | 10.8(1.3) | 11.1(2.6) | 50.2(1.4) | 44.9(4.4) |
| LapRLS | 6.4(1.2) | 6.2(1.6) | 33.2(8.6) | 33.1(9.6) | 10.1(1.4) | 10.5(2.4) | 49.1(1.6) | 42.4(5.2) |
| SpSVM | 10.3(14.1) | 9.8(14.6) | 17.7(11.2) | 18.9(12.1) | 7.6(1.3) | 9.2(2.4) | 48.4(2.7) | 50.4(5.6) |
| SpRLS | 5.5(1.1) | 4.9(1.7) | 15.2(2.4) | 17.1(4.1) | 8.1(1.8) | 9.0(2.7) | 37.8(2.8) | 36.7(3.3) |

TABLE 5

Semi-supervised setting: Error rates on the unlabeled and test examples
for WebKb dataset

| Dataset→ | WebKb(page) | | WebKb( link) | | Web Kb (page + link) | |
|---|---|---|---|---|---|---|
| Algorithm ↓ | unlabel | test | unlabel | test | unlabel | test |
| SVM | 27.6(17.8) | 27.1(17.3) | 20.8(2.3) | 19.6(2.5) | 20.2(2.7) | 19.8(4.7) |
| RLS | 21.9(0.6) | 21.7(1.6) | 22.2(0.9) | 20.6(2.5) | 18.7(6.5) | 18.8(7.2) |
| LapSVM | 16.4(6.8) | 16.4(5.5) | 16.1(4.6) | 15.1(5.6) | 15.7(7.3) | 16.4(7.2) |
| LapRLS | 14.2(6.6) | 15.0(6.1) | 31.4(24.5) | 28.7(26.2) | 13.2(7.4) | 14.7(7.5) |
| SpSVM | 57.5(33.3) | 57.6(32.5) | 70.6(22.2) | 72.1(23.0) | 78.0(0.6) | 78.5(2.3) |
| SpRLS | 10.1(4.5) | 9.7(5.3) | 13.7(4.4) | 13.3(4.6) | 4.2(1.7) | 5.0(2.6) |

6 CONCLUSION

A semi-supervised learning approach is provided based on semiparametric regularization which extends to the out-of-sample data points. A specific parametric function is learned from the whole data including the plentiful unlabeled data. This specific parametric function is then incorporated into the supervised learning on a few available labeled data to exploit the geometric structure of the marginal distribution of the data. This approach allows a family of algorithms to be developed based on various choices of the original RKHS and the loss function. Empirical evaluations demonstrate that the proposed approach outperforms the state-of-the-art methods in the literature on a variety of classification tasks.

The present method may be implemented on a general purpose computer or a specially adapted machine. Typically, a programmable processor will execute machine-readable instructions stored on a computer-readable medium. In other cases, the method will be implemented using application specific hardware, and may not be reprogrammable.

An exemplary programmable computing device for implementing an embodiment of the invention includes at least a processing unit and a memory. Depending on the exact configuration and type of computing device, the memory may be volatile (such as RAM), non-volatile (such as ROM, flash memory, etc.) or some combination of the two. Additionally, the device may also have additional features/functionality. For example, the device may also include additional storage (removable and/or non-removable) including, but not limited to, magnetic or optical disks or tapes. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory, FRAM, or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the device. The device may also contain one or more communications connections that allow the device to communicate with other devices. Such communication connections may include, for example, Ethernet, wireless communications, optical communications, serial busses, parallel busses, and the like. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

One use for the present method is to process information databases, which may be private or public. For example, the information database may comprise information received from the Internet, such as the content of various web pages from world wide web sites, or other information found on the Internet. In other cases, the data may be more structured, for example the content of the Facebook social networking site/system. Further, the information may be private user information, such as the contents of a user's hard drive, especially, for example, the user generated or downloaded content.

Having described specific embodiments of the present invention, it will be understood that many modifications thereof will readily appear or may be suggested to those skilled in the art, and it is intended therefore that this invention is limited only by the spirit and scope of the following claims.

REFERENCES

[1] Y. Altun, D. McAllester, and M. Belkin. Maximum margin semi-supervised learning for structured variables. In *Advances in Neural Information Processing Systems (NIPS)* 18, 2005.

[2] M. Belkin, P. Niyogi, and V. Sindhwani. Manifold regularization: A geometric framework for learning from labeled and unlabeled examples. *Journal of Machine Learning Research*, 7:2399-2434, 2006.

[3] A. Blum and S. Chawla. Learning from labeled and unlabeled data using graph mincuts. In *ICML*, pages 19-26, 2001.

[4] O. Chapelle, B. Schölkopf, and A. Zien, editors. *Semi-Supervised Learning*. MIT Press, Cambridge, Mass., 2006.

[5] O. Chapelle, J. Weston, and B. Schölkopf. Cluster kernels for semi-supervised learning. In *NIPS*, pages 585-592, 2002.

[6] O. Chapelle and A. Zien. Semi-supervised classification by low density separation. In *Proceedings of the Tenth International Workshop on Artificial Intelligence and Statistics*, 2005.

[7] Y. Grandvalet and Y. Bengio. Semi-supervised learning by entropy minimization. In *NIPS*, 2004.

[8] T. Joachims. Transductive learning via spectral graph partitioning. In *ICML*, pages 290-297, 2003.

[9] A. Kapoor, Y. A. Qi, H. Ahn, and R. W. Picard. Hyperparameter and kernel learning for graph based semi-supervised classification. In *NIPS*, 2005.

[10] J. D. Lafferty, X. Zhu, and Y. Liu. Kernel conditional random fields: representation and clique selection. In *ICML*, 2004.

[11] T. P. Pham, H. T. Ng, and W. S. Lee. Word sense disambiguation with semi-supervised learning. In *AAAI*, pages 1093-1098, 2005.

[12] B. Schölkopf and A. Smola. *Learning with Kernels Support Vector Machines, Regularization, Optimization and Beyond*. MIT Press, Cambridge, Mass., 2002.

[13] V. Sindhwani, P. Niyogi, and M. Belkin. Beyond the point cloud: from transductive to semi-supervised learning. In *Proc. ICML*, 2005.

[14] M. Szummer and T. Jaakkola. Information regularization with partially labeled data. In *Advances in Neural Information Processing Systems*, 15, 2002.

[15] A. N. Tikhonov. On solving ill-posed problem and method of regularization. *Dokl. Akad. Nauk USSR* 153, pages 501-504, 1963.

[16] V. N. Vapnik. *Statistical Learning Theory*. John Wiley & Sons, Inc, 1998.

[17] L. Xu and D. Schuurmans. Unsupervised and semisupervised multi-class support vector machines. In *AAAI*, pages 904-910, 2005.

[18] X. Zhang and W. S. Lee. Hyperparameter learning for graph based semi-supervised learning algorithms. In *NIPS*, 2006.

[19] D. Zhou, O. Bousquet, T. N. Lal, J. Weston, and B. Schölkopf. Learning with local and global consistency. In *NIPS*, 2003.

[20] X. Zhu. Semi-supervised learning literature survey. Technical Report 1530, Computer Sciences, University of Wisconsin-Madison, 2005.

[21] X. Zhu, Z. Ghahramani, and J. D. Lafferty. Semi-supervised learning using gaussian fields and harmonic functions. In *ICML*, pages 912-919, 2003.

What is claimed is:

1. A semisupervised learning method, comprising:
analyzing a data set using at least one automated processor, comprising labeled data and unlabeled data, by performing a principal component analysis to derive parameters of a parametric function of the feature space reflecting a geometric structure of a marginal distribution of the data set according to its principal components;
performing supervised learning on the labeled data using the at least one automated processor, based on the parametric function of the feature space reflecting the geometric structure of the marginal distribution of the entire data set; and
storing information derived from said supervised learning in a computer memory,
wherein the parametric function is dependent on both the data set and said principal component analysis.

2. The method according to claim 1, wherein the analyzing is performed through a parametric function by principal component analysis in a Reproducing Kernel Hilbert Space, and the supervised learning is performed based on the labeled data in the Reproducing Kernel Hilbert Space, the Reproducing Kernel Hilbert Space being extended by including the parametric function derived based on the entire data set.

3. The method according to claim 1, further comprising classifying unlabeled data based on the stored supervised learning information.

4. The method according to claim 1, further comprising performing a binary classification of unlabeled data based on the stored supervised learning information.

5. The method according to claim 1, wherein data points projected onto a principal component axis maintain their geometric relationship in the feature space with other data points.

6. The method according to claim 1, wherein the principal component analysis comprises a kernel principal component analysis.

7. An apparatus for performing semisupervised learning on a data set, comprising:
- a memory adapted to store a data set, comprising labeled data and unlabeled data;
- at least one automated processor, configured to analyze the data set through a parametric function derived by principal component analysis of the feature space reflecting a geometric structure of a marginal distribution of the data set according to its principal components, and performing supervised learning on the labeled data based on the parametric function derived by principal component analysis of the feature space reflecting the geometric structure of the entire data set; and
- a memory adapted to store information derived from said supervised learning in a computer memory.

8. The apparatus according to claim 7, wherein the principal component analysis is performed in a Reproducing Kernel Hilbert Space, and the supervised learning is performed based on the labeled data in the Reproducing Kernel Hilbert Space, the Reproducing Kernel Hilbert Space being extended by including the parametric function derived based on the entire data set.

9. The apparatus according to claim 7, wherein the automated processor classifies unlabeled data based on the stored supervised learning information.

10. The apparatus according to claim 7, wherein the automated processor performs a binary classification of unlabeled data based on the stored supervised learning information.

11. The apparatus according to claim 7, wherein data points projected onto a principal component axis maintain their geometric relationship in the feature space with other data points.

12. The apparatus according to claim 7, wherein the principal component analysis comprises a kernel principal component analysis.

13. A method, comprising:
- storing a data set comprising both labeled and unlabeled data;
- analyzing, with at least one automated processor, the entire data set using a statistical analysis of variance within the feature space of the data set to determine a geometric structure of the data set dependent on the statistical analysis of variance, by performing at least one orthogonal linear transform;
- analyzing, with the at least one automated processor, the labeled data in dependence on the determined geometric structure of the data set dependent on the statistical analysis of variance, to learn at least one classification criterion from the classification and features of the labeled data; and
- automatically classifying unlabeled data based on the learned classification criterion.

14. The method according to claim 13, further comprising classifying at least one unlabeled data point.

15. The method according to claim 13, further comprising classifying at least one data point outside of the data set.

16. The method according to claim 13, wherein the analyzing performs a kernel principal component analysis of the data set.

17. The method according to claim 16, wherein the kernel principal component analysis is performed in a Reproducing Kernel Hilbert Space.

18. The method according to claim 17, wherein the Reproducing Kernel Hilbert Space is extended by including the determined geometric structure based on the entire data set.

19. The method according to claim 13, wherein a projection of the data is determined which maximizes a variance of features within the feature space.

20. The method according to claim 13, further comprising analyzing eigenvalues of the entire data set, including both labeled and unlabeled data.

* * * * *